(12) United States Patent
Wang et al.

(10) Patent No.: US 7,596,655 B2
(45) Date of Patent: Sep. 29, 2009

(54) FLASH STORAGE SYSTEM WITH DATA STORAGE SECURITY

(75) Inventors: Yu-Hsien Wang, Taipei (TW); Chanson Lin, Taipei (TW); Tung-Hsien Wu, Taipei (TW); Chien-Chang Su, Taipei (TW); Gow-Jeng Lin, Taipei (TW); Ching-Chung Hsu, Taipei (TW); Kuang-Yuan Chen, Taipei (TW)

(73) Assignee: Prolific Technology Inc., Taipei (TW)

( * ) Notice: Subject to any disclaimer, the term of this patent is extended or adjusted under 35 U.S.C. 154(b) by 520 days.

(21) Appl. No.: 11/368,488

(22) Filed: Mar. 7, 2006

(65) Prior Publication Data

US 2006/0271727 A1 Nov. 30, 2006

(30) Foreign Application Priority Data

May 24, 2005 (TW) .............................. 94116964 A (51) Int. Cl.
*G06F 12/00* (2006.01)
(52) U.S. Cl. .................. 711/103; 711/202; 711/205; 711/206; 711/207
(58) Field of Classification Search ................. 711/103, 711/154, 203, 205–209; 365/185.33
See application file for complete search history.

(56) References Cited

U.S. PATENT DOCUMENTS 6,839,826 B2 * 1/2005 Cernea ..................... 711/202
7,509,474 B2 * 3/2009 Wong ....................... 711/206

* cited by examiner

*Primary Examiner*—Jasmine Song
(74) *Attorney, Agent, or Firm*—Rosenberg, Klein & Lee (57) ABSTRACT

A flash storage comprises a flash memory, including a plurality of physical memory blocks, each of physical memory blocks comprising a plurality of memory segments, and a plurality of physical sectors, and each of physical sectors being further provided therein with at least a user data column and a logical address pointer column. When physical data is written into the user data column, writing logical address pointer data into the logical address pointer column of the same physical sector may be performed together by the control of a micro-controller. Furthermore, the logical address pointer data in the same memory segment are arranged to be a backup memory segment address mapping table and then stored in one physical memory block. The backup memory segment address mapping table may be loaded directly and stored into a registered memory by the micro-controller when the system boots. Thus, not only shortening the startup duration of the flash storage, but also saving the memory capacity of the registered memory and securing data access may be obtained.

25 Claims, 6 Drawing Sheets

FLASH STORAGE SYSTEM WITH DATA STORAGE SECURITY

FIELD OF THE INVENTION

The present invention relates to a flash storage allowed for not only shortening the startup duration thereof, but also saving the memory capacity of a registered memory and securing data access.

BACKGROUND

Figure 1:
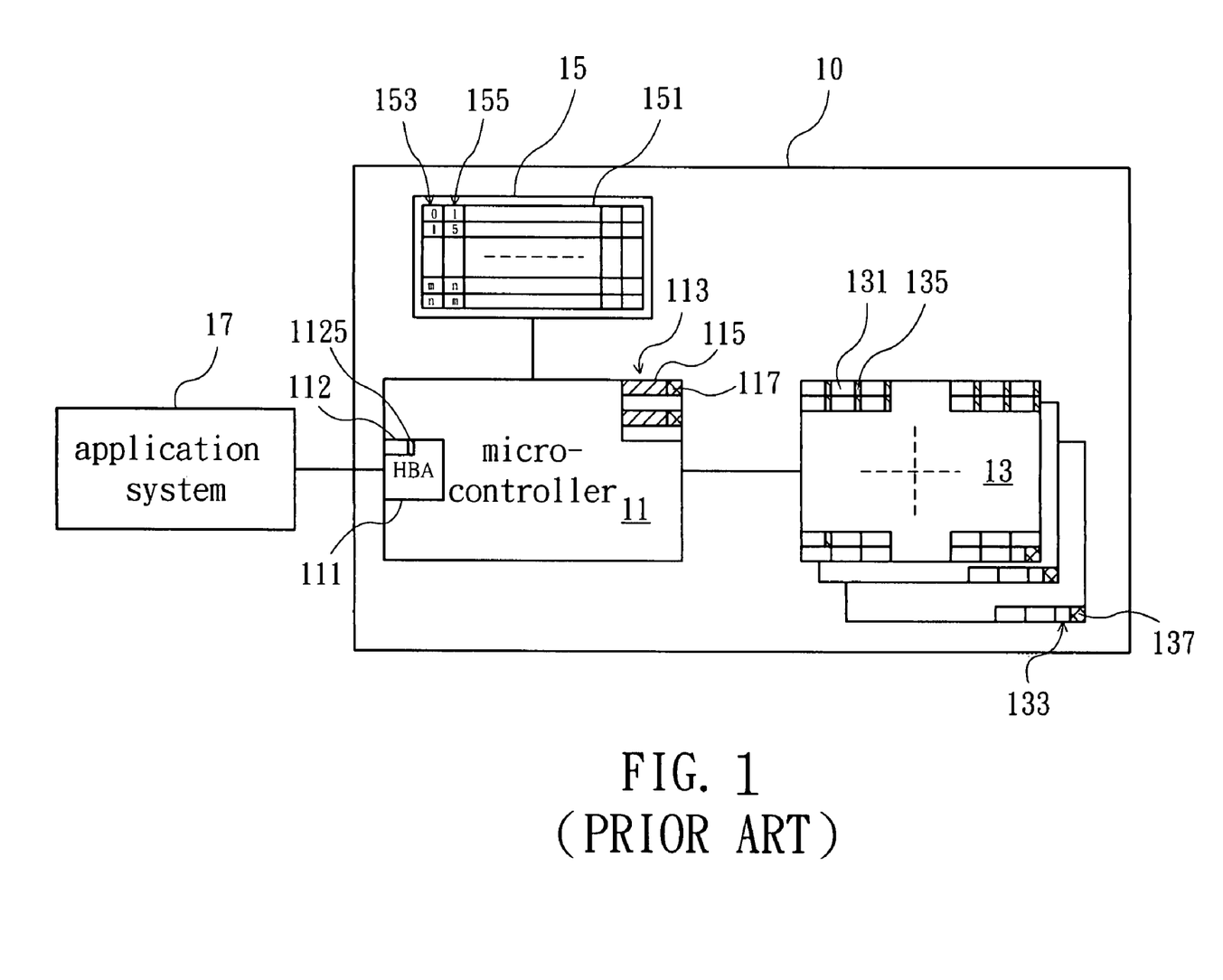
FIG. 1 is a structural diagram of a conventional flash storage.

Accordingly, a conventional flash storage is shown in FIG. 1. A flash storage 10 mainly comprises a micro-controller 11, a registered memory 15, and at least one flash memory (device) 13, in which the micro-controller 11 may be connected to the registered memory 15, the flash memory 13, and a application system 17, while the flash memory 13 comprises therein a plurality of physical memory blocks 131, each of physical memories having one physical address 135.

Generally, the application system 17 may be allowed to only read or assign a logical memory block 112 virtually presented in the micro-controller 11, a plurality of the logical memory blocks 112 being located in a logical memory block address (HBA) 111, according to the not exactly the same data access protocol between the application system 17 and the flash storage 10. By means of the operation of micro-controller 11, each of logical memory blocks 112 to be accessed by the application system 17 may be corresponded to a corresponding physical memory block 131 in the flash memory 13, and again there may be presented with a corresponding relation between a logical address 1125 of the logical memory block 112 and a physical address 135 of the corresponding physical memory block 131, while the latter two are recorded in a logical address column 153 and a physical address column 155, respectively, of a linkage table 151 being stored in the registered memory 15.

Furthermore, in each of flash memories 13, there is provided with a memory type block 133 having memory ID data 137 stored therein. Again, in the micro-controller 11, there is also provided with a corresponding memory program unit 113 having a plurality of memory accessing programs 115 stored therein, each memory accessing program 115 also having matched memory ID data (flash ID code) 117. The memory ID data 137 is read when the micro-controller 11 is started (read ID command), whereby one corresponding memory ID data 117 and memory accessing program 115 in the memory program unit 113 may be selected to be the executive program for the micro-controller 11 in relation to the flash memory 13 of this type.

Moreover, referring to FIG. 1A cooperatively, when the data accessing operation with respect to one logical memory block 112 having a logical location of m is desired by the application system 17, the corresponding physical memory block 131 with the physical address 135 recorded as n may be found in the linkage table 115 by the micro-controller 11. In accordance with the record of replacement data 139 in the physical memory block 131, however, the physical memory block 131 has been damaged or stored with various data. Therefore, the data desired to be accessed should be presented in a physical memory block 1312 with a physical address 1352 registered as 5, while the data originally presented in the physical memory block 1312 may be moved to another physical memory block 1313 with a physical address 1353 registered as 1, and then the fact that the data having been stored in the physical memory block 1313 may be written into the replacement data 139 in the physical memory block 1312 after this data movement is completed.

Furthermore, referring to FIG. 1B, the interior of the flash storage 10 is presented with a system clock consisting of a plurality of rising edges 191 and a plurality of falling edges 195. However, the data access signal of the micro-controller 11 may be changed only at the rising edges 191 of the system clock.

Although the effect of data access has been provided for the conventional flash storage 10, there are still drawbacks as follows:

1. Writing data into the replacement data of the physical memory block may be allowable only when the data accessing operation is completed, and there is no consistency between the physical memory block and the replacement data so as to produce damage in accessed data if an abnormal behavior, such as power failure and so on, occurs at this time.

2. The linkage table is used to record the relationship between the physical address and logical address of the whole flash memory and the size thereof increases as the number of the physical memory block in the flash memory increases, thereby the capacity of the flash memory must be also increased correspondingly.

3. In the micro-controller, only the memory accessing program and category of flash memory having been registered in the memory program unit thereof may be executed, and on the contrary, the connected flash memory may be not accepted or executed by the micro-controller if the category or type thereof is not registered in the memory program unit.

4. The change in the data access signal of the micro-controller should occur at the rising edges of the system clock only, in such a way that the timely adjustment of internal frequency is impossible, thereby incapability of saving electrical power effectively.

SUMMARY OF THE INVENTION

For this purpose, how to design a flash storage, not only securing data access, but also saving the memory capacity of a registered memory and electrical power consumption, is the key point of the present invention.

Accordingly, it is the primary object of the present invention to provide a flash storage, which is mainly provided with a logical address pointer column in each physical sector, allowing to write physical data together with a logical address pointer data into the physical sector simultaneously, in such a way that a plurality of logical pointer data may be presented in the same physical memory block, whereby the safety and reliability in data access may be ensured.

It is the secondary object of the present invention to provide a flash storage, mainly dividing each flash memory into a plurality of memory segments, at least one memory segment sharing a set of memory segment address linkage table and stored in a registered memory, whereby the capacity of the registered memory may be controlled effectively.

It is another object of the present invention to provide a flash storage, mainly storing a linkage table or a memory segment address mapping table in at least one control memory block to be a backup linkage table or a backup memory segment address mapping table, the backup linkage table or the backup memory segment address mapping table being loaded into the registered memory directly when the micro-controller boots, whereby the duration of creating table at startup may be shortened.

It is still another object of the present invention to provide a flash storage, in which, mainly, at least one physical logical block in each of the plurality of flash memory devices corresponding to one another may be combined as one memory segment, and may be connected with the micro-controller in the form of series, parallel, or parallel/series selectively, thereby time of data access may be saved.

It is yet another object of the present invention to provide a flash storage, in which, mainly, a plurality of control memory blocks may be used to load and then store a backup linkage table or a backup memory segment address mapping table in turn, so as to avoid the occurrence of inadequate usage of one single control memory block, in such a way that not only the service life of control memory block may be prolonged, but also the integrity of backup data may be ensured.

It is yet still another object of the present invention to provide a flash storage, in which, mainly, a physical memory block of each flash memory may be stored with a memory accessing program, loaded into a memory program unit of the micro-controller directly to be executed by this micro-controller when this micro-controller is connected thereto, thereby the category and type of the flash memory allowed to match the micro-controller may be broadened, while the drawback that data access is impossible for the micro-controller with respect to one of the flash memories may be avoided.

It is another object of the present invention to provide a flash storage, in which, mainly, for each of the constructed physical memory blocks in the memory page, the conditions thereof may be discerned, and the placement thereof may be arranged, in a front section, rear section, or last section by the micro-controller, for speeding data access of the flash memory.

It is another object of the present invention to provide a flash storage, in which, mainly, the rising edge or falling edge of the system clock may be used by the micro-controller as a basis for data access signal, for thereby achieving the effect of adjustment of internal frequency and electrical power-saving.

To this end, for achieving aforementioned objects, the present invention provides a flash storage, mainly comprising: a micro-controller; at least one flash memory, connected to the micro-controller, each comprising a plurality of physical memory blocks therein, while each of the physical memory blocks further comprising a physical address and a plurality of physical sectors, and then each of the physical sectors at least comprising a user data column and a logical address pointer column, in which writing logical address pointer data into each logical address pointer column is allowed when the user data column is stored therein with physical data, the logical address pointer data being recorded with a logical address of a logical memory block corresponding to the physical memory block; and a registered memory, connected to the micro-controller, used for storing a linkage table recorded with the physical address of each physical memory block and the logical address of one of the logical memory blocks corresponding thereto.

Further, for achieving the aforementioned objects, the present invention further provides a flash storage, which mainly comprises a micro-controller and at least one flash memory allowed for connecting to the micro-controller, each flash memory comprising a plurality of physical memory blocks therein, one of the physical memory blocks being defined as a memory type block used for storing a memory accessing program to be loaded directly when the micro-controller boots, so as to execute data accessing operation with respect to the flash memory.

Further, for achieving the aforementioned objects, the present invention further provides a flash storage, which mainly comprises a micro-controller and at least one flash memory allowed for connecting to the micro-controller, the flash storage comprising a system clock therein, the system clock further comprising a plurality of rising edges and a plurality of falling edges, each rising edge and each falling edge being individually selected as a basis for a data access signal with respect to the micro-controller.

Further, for achieving the aforementioned objects, the present invention further provides a flash storage, which mainly comprises a micro-controller and at least one flash memory allowed for connecting to the micro-controller, the flash memory comprising a plurality of storages, and at least one physical memory block in each storage corresponding to one another being allowed to constitute one memory page together, one page, in which all of the physical memory blocks are all perfect physical memory blocks without defects, being defined as a normal memory page, while another memory page, in which at least one physical memory block presented therein is an imperfect physical memory block with defects, being defined as an abnormal memory page, the normal memory page being arranged in a front section of the flash memory and the abnormal memory page being arranged in a rear section of the flash memory by means of the operation of the micro-controller.

BRIEF DESCRIPTION OF DRAWINGS

FIG. 1A is a structural diagram of the conventional flash storage in data access;

FIG. 1B is a clock diagram of the conventional flash storage in data access;

DETAILED DESCRIPTION

The structural features and the effects to be achieved may further be understood and appreciated by reference to the presently preferred embodiments together with the detailed description as follows.

Figures 2, 2A:
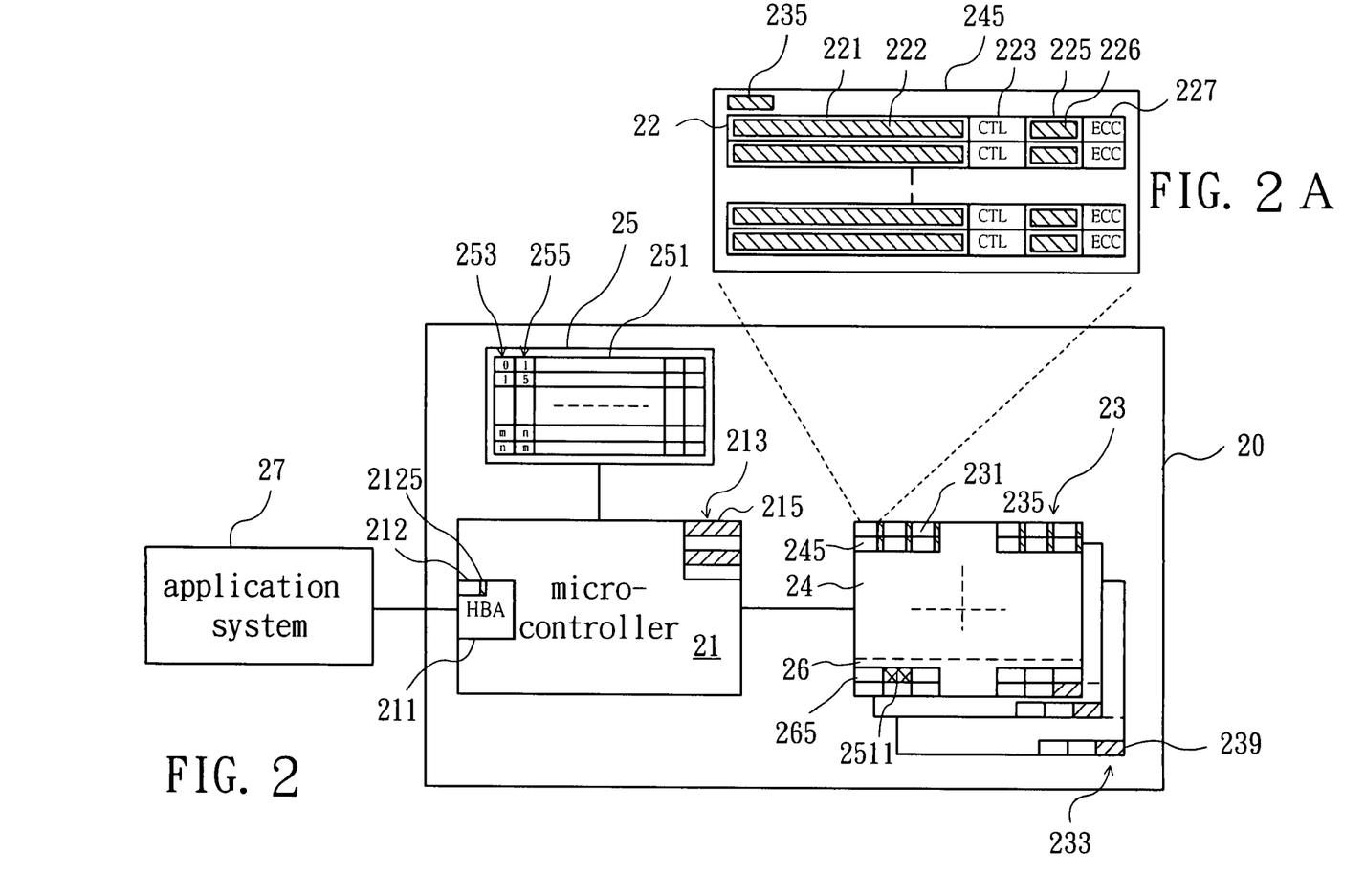
FIG. 2 is a structural diagram of a flash storage according to one preferred embodiment of the present invention.
FIG. 2A is a structural diagram of a physical memory block of the present invention.

Firstly, referring to FIG. 2 collectively, there is shown a structural diagram of a flash storage according to one preferred embodiment of the present invention. As shown in this figure, a flash storage 20 of the present invention mainly comprises a micro-controller 21, a registered memory 25, and at least one flash memory (device) 23, in which the micro-controller 21 may be connected to the registered memory 25, the flash memory 23, and an application system 27, such as host system, player system, recording system, and so on.

Moreover, the flash memory 23 further comprises a plurality of physical memory blocks 231, each having a physical address 235.

Generally, only reading or assigning a logical memory block 212 which, a plurality of logical memory blocks 212 being located in a logical memory block address area (HBA) 211, virtually presented in the micro-controller 21 is allowable for the application system 27, due to the not exactly the same data access protocol between this application system 27 and the flash storage 20, like the conventional architecture. By means of the operation of the micro-controller 21, each logical memory block 212 accessed by the application system 27 may be corresponded to one corresponding physical memory block 231 in the flash memory 23, while a corresponding relation between a logical address 2125 of the logical memory block 212 and a physical address 235 between the corresponding physical memory block 231 may be presented, the latter two being recorded in a logical address column 253 and a physical address column 255, respectively, of a linkage table 251, which may be stored in the registered memory 25 selected as a random-access memory (RAM).

The flash memory 23 of the present invention may be divided into two major blocks including a host accessible area (HAA) 24 and a system control area (SCA) 26. The physical memory block (231) in the HAA 24 may be defined as a data memory block 245, which is a physical memory block assigned by the application system 27. Moreover, the physical memory block (231) in the SCA 26 may be then defined as a control memory block (BLT) 265, which is a physical memory block used by the micro-controller 21, but not assigned by the application system 27.

In the data memory block 245, there is provided with a plurality of physical sectors 22, each having a user data column 221 used for storing physical data 222, control data (CTL data) 223, a logical address pointer column 225 used for storing logical address pointer data 226, and an error check code (ECC) 227, in which the ECC 227 is located at the end of the physical sector 22, allowed for protecting the physical data 222, control data 223, and logical address pointer data 226 at the same time in order to secure reliability in data access. Further, as the physical data 222 is written into one of the user data columns 221, the micro-controller 21 may also command to write logical address pointer data 226 into the logical address pointer column 225 in the same physical sector 22 together and simultaneously, in such a way that a plurality of same logical address pointer data 226 may be presented in the same data memory block 245. Thus, even if an abnormal situation, such as abrupt power failure, as an example, occurs after the physical data 222 has been written in one of the physical sectors 22, data access may be still secured effectively, due to the fact that the corresponding logical address may be found quickly via the logical address pointer data 226 recorded in the same data memory block 245.

Furthermore, in the data memory block 245 of the present invention, there is presented with at least one logical address pointer data 226 having the adversely-pointed and corresponded logical memory block 212 or logical address 2125 recorded therein. For instance, the record in the logical address pointer column 225 having the physical address of n is: pointing to the logical memory block 212 having the logical address 2125 of m. This adversely-pointed mode of the data memory block 245 may be used to facilitate the presence of a number of same logical address pointer data 226 in the same data memory block 245, for the enhancement of the security in data access.

Furthermore, the linkage table 251 of the present invention may be created by scanning the logical address pointer data 226 in each data memory block 245 one by one and then be buffered into the registered memory 25 when the system or micro-controller 21 boots, though, the way that rescanning the logical address pointer data 226 once every startup or system start to create the linkage table 251 is not beneficial to the reduction of duration of system start or startup. Thereby, in another embodiment of the present invention, the micro-controller 21 may command at least control memory block 265 in the system control area 26 to load and store the linkage table 251 having been presented in the registered memory 25 to be a backup linkage table 2511 any time, at fixed periods, or at specific timings. Upon the next startup or system start, scanning with respect to the logical address pointer data 226 in each data memory block 245 one by one is not performed, instead, directly loading that backup linkage table 2511 and storing it as one linkage table 251 is performed by the micro-controller 21. In this manner, the duration of creating table at startup may be shortened considerably.

Furthermore, at least one of the control memory blocks 265 in the system control area 36 may be defined as a memory type block 233, and stored therein with a memory accessing program 239 capable of executing that flash memory 23 data accessing operation. As the flash memory 23 connects to the micro-controller 21, this memory accessing program 239 may be read and loaded by the micro-controller 21 directly, and then stored in a memory program unit 213 of the micro-controller 21 to be a memory accessing program 215 executed by the micro-controller 21. With such a design, it is not necessary to store limited amount of memory ID data (117) and the memory accessing program (115) previously in the micro-controller 21 of the present invention, and then there is also no so-called restriction on the application category of the flash memory naturally, either, thus broadening the application field of the micro-controller 21.

Figure 3:
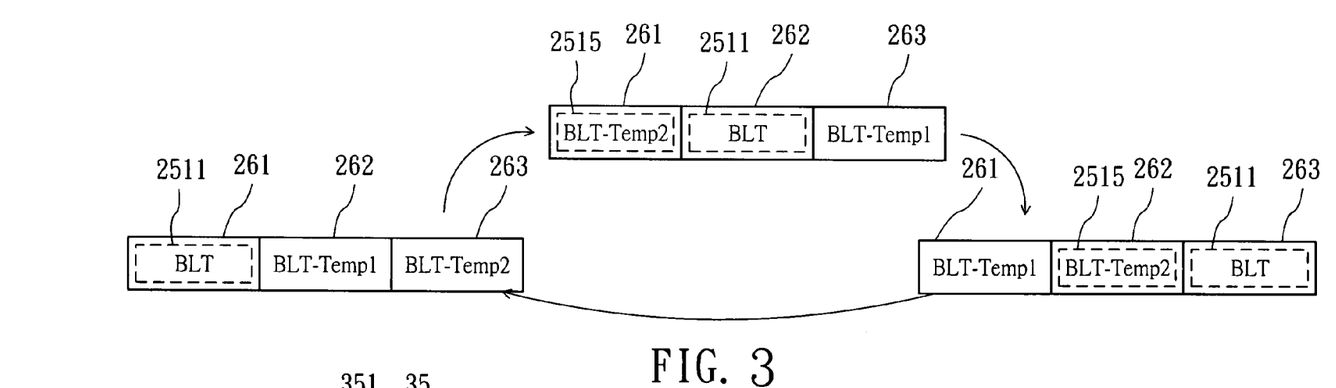
FIG. 3 is an operation diagram of a control memory block of the present invention in data access.

Moreover, referring to FIG. 3, there is shown an operation diagram of a control memory block of the present invention in data access. As shown in this figure, the system control area 36 of the present invention is provided therein with at least one control memory area 261 to store the backup linkage table 2511. When the latest backup linkage table 2511 has been stored in the first control memory block 261 as marked by a dotted line BLT, a second control memory block 262 may be set as a backup linkage table first temporary block (BLT-Temp1), while a third control memory block 263 may be set as a backup linkage table second temporary block (BLT-Temp2). Then, if storing the second next latest backup linkage table 2511 is required by the micro-controller 21 in accordance with protocol, storing it in the second control memory block 262 in turn is requested. At this moment, the second control memory block 263 may be set as the backup linkage table first temporary area (BLT-Temp1), while the backup linkage table (2511) originally stored in the first control memory block 261 may become a past linkage table 2515, and the first control memory block 261 may be then set as the backup linkage table second temporary block (BLT-Temp2), although this past linkage table may still exist. The integrity of the linkage table may be further secured due to the coexistence of the backup linkage tables 2511 and 2515.

Similarly, if storing the third next latest backup linkage table 2511 is required by the micro-controller 21 in accordance with protocol, storing it in the third control memory block 263 in turn is requested. At this moment, the first control memory block 261 may be set as the backup linkage table first temporary area (BLT-Temp1), while the backup linkage table (2511) originally stored in the second control memory block 262 may become a past linkage table 2515, and the second control memory block 262 may be also set as the backup linkage table second temporary area (BLT-Temp2); the rest may be deduced by analogy. Always storing the linkage table 2511 in one specific control memory block (261), leading to the over use of and then the damage to this specific control memory block (261), may be avoided by storing the linkage table 2511 in the first control memory block 261, the second control memory block 262, and the third control memory block 263 in turn, thereby the service life of the flash memory 23 may be effectively prolonged.

Figure 4:
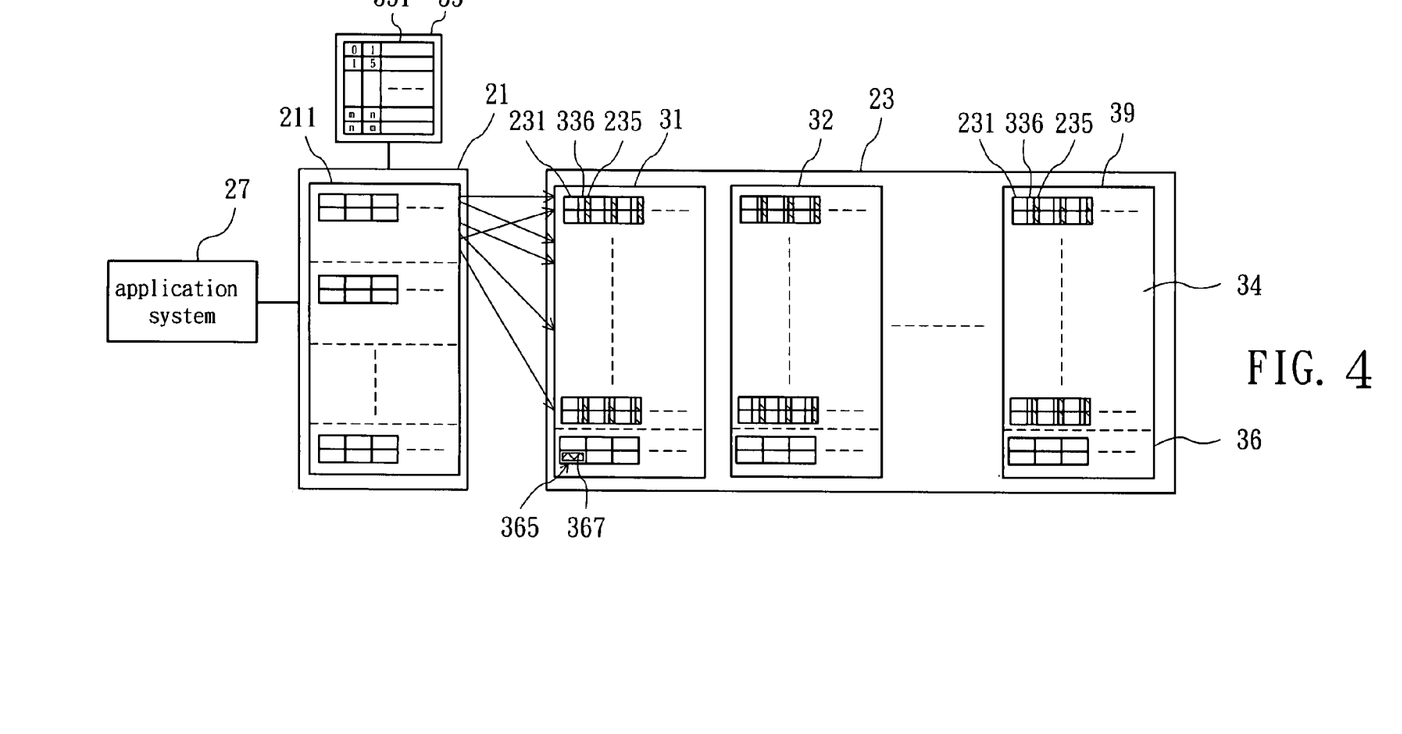
FIG. 4 is a structural diagram of a flash storage according to another embodiment of the present invention.

Additionally, referring to FIG. 4, there is shown a structural diagram according to another embodiment of the present invention. As shown in this figure, the flash memory 23 of the present invention may be separated by a plurality of memory segments 31, 32-39, each of memory segments having a plurality of physical memory blocks 231 presented therein, and also being separated by a host accessible area 34 and a system control area 36 as mentioned above, while the physical memory block located in the system control area 36 is defined as a control memory block 365.

Further, the physical memory block 231 located in the host accessible area 34 may comprise a physical address 235 and logical address pointer data 336. In this embodiment, one memory segment 31 may be considered as a range for creating table, in which a memory segment address mapping table 351 is created based on the logical address pointer data 336 in the same memory segment 31, in such a way that the memory segment address mapping table may be allowed to replace the linkage table (251) in the above embodiment and be stored in the registered memory 35, for providing for the micro-controller 21 and application system 27. Moreover, the memory segment address mapping table 351 may be also loaded and stored in the control memory block 365 any time, at fixed periods, or at specific timings, so as to be a backup memory segment address mapping table 367.

Naturally, one control memory block 365 may be stored therein with a plurality of backup memory segment address mapping tables 367 simultaneously, while any one of the backup memory segment address mapping tables 367 may be also recorded therein with the logical address pointer data 336 of the plurality of memory segments 31, 32-39 simultaneously.

The size of the memory segment address mapping table 351 created depending upon the number of physical memory blocks 231 in each memory segment 31 may be reduced considerably in relation to that of the aforementioned linkage table (251), due to the fact that this number is limited. Thus, the capacity of the registered memory 35 used for storing the memory segment address mapping table 351 may be reduced significantly, In other words, the capacity of the registered memory 35 may approximate to (for example, somewhat greater than or equal to) the size of the memory segment address mapping table 351. However, in various embodiments of the present invention, it is preferred that the number of the physical memory blocks 231 in each of memory segments 31, 32-39 is 256.

Further, the number of the logical memory blocks received by the application system 27 may never change, still stored in the logical memory block address area 211. The logical memory block address area 211, however, may be separated by a plurality of small areas, each representing one of the memory segments 31, 32-39, by the micro-controller 21 depending upon the size of the memory segment 31, correspondingly. If the logical memory block assigned by the application system 27 is the physical memory block 231 of dissimilar memory segment 31, 32-39, the backup memory segment address mapping table 367 of this memory segment 31, 32-39 may be read by the micro-controller 21 immediately and loaded in the registered memory 35 to be an up-to-date memory segment address mapping table 351, without the effect of incapability of reception on data access.

Subsequently, referring to FIGS. 5A, 5B, and 5C, there are shown structural diagrams of the flash storages according to other embodiments of the present invention, respectively. In the embodiment as illustrated in FIG. 5A, it is principal that at least one physical memory block 231 in each of the plurality flash memories 23, 55, 57, 59 may be combined as one memory segment 51, in which the flash memories 23, 55, 57, and 59 may be connected to the micro-controller 21 in series.

Figures 5A, 5C:
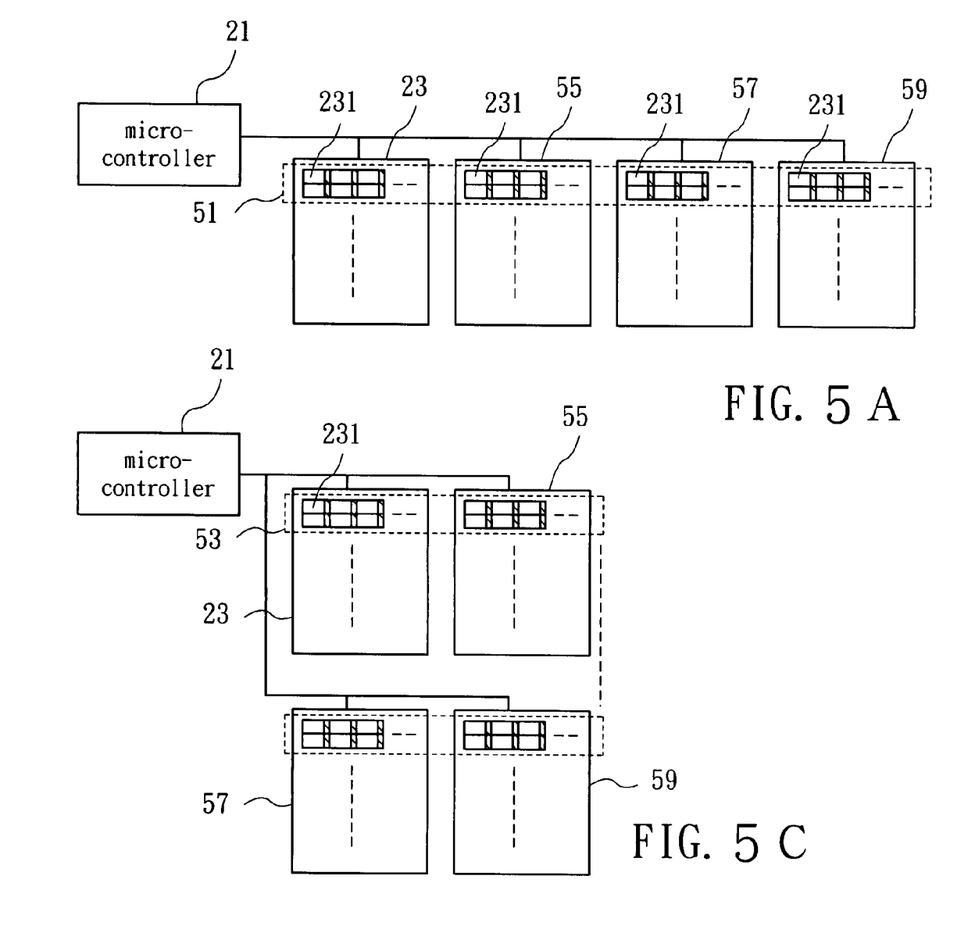
FIG. 5A is a structural diagram of a flash storage according to still another embodiment of the present invention.
FIG. 5C is a structural diagram of a flash storage according to yet still another embodiment of the present invention.
Figure 5B:
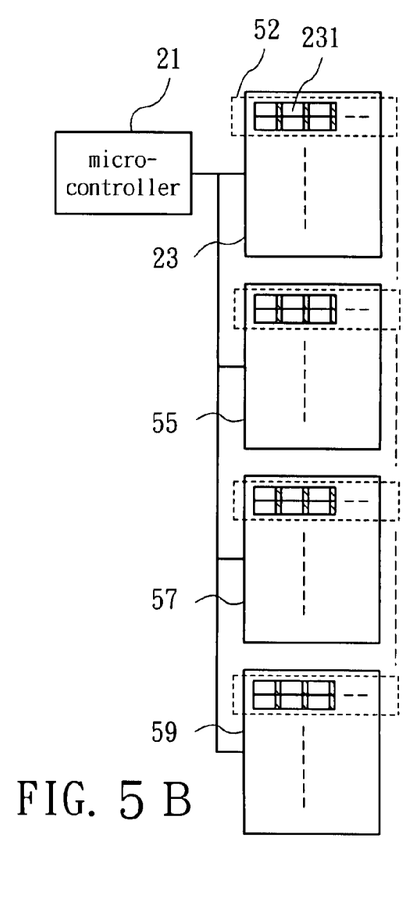
FIG. 5B is a structural diagram of a flash storage according to yet another embodiment of the present invention.

Also, the flash memories 23, 55, 57, and 59 may be also connected with the micro-controller 21 in parallel, of course, for speeding data access, while at least one physical memory block 231 in each flash memory 23, 55, 57, 59 may be still combined as one memory segment 52, as shown in FIG. 5B.

Furthermore, the flash memories 23, 55, 57, and 59 may be also connected with the micro-controller 21 in series/parallel hybrid mode, while at least one physical memory block 231 in each flash memory 23, 55, 57, 59 may be also combined as one memory segment 53, as shown in FIG. 5C.

Figure 6:
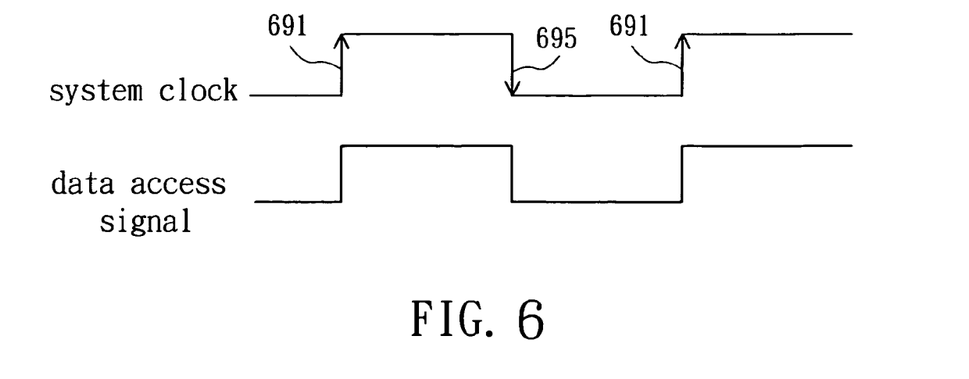
FIG. 6 is a clock diagram of the flash storage of the present invention in data access.

Next, referring to FIG. 6, there is shown a clock diagram of the flash memory of the present invention in data access. As illustrated in this figure, the flash storage of the present invention is presented therein with a system clock comprising a plurality of rising edges 691 and a plurality of falling edges 695. For the micro-controller 21 of the present invention, the basis for changing the data access signal may be not limited to the rising edge 691 of the system clock as the conventional architecture; instead, the falling edge 695 of the system clock is also available. Therefore, when the operation of data access signal is executed by the micro-controller 21, the frequency of the system clock corresponding to the internal frequency may be reduced significantly, whereby reducing the waste of electrical power of the system.

Figure 7:
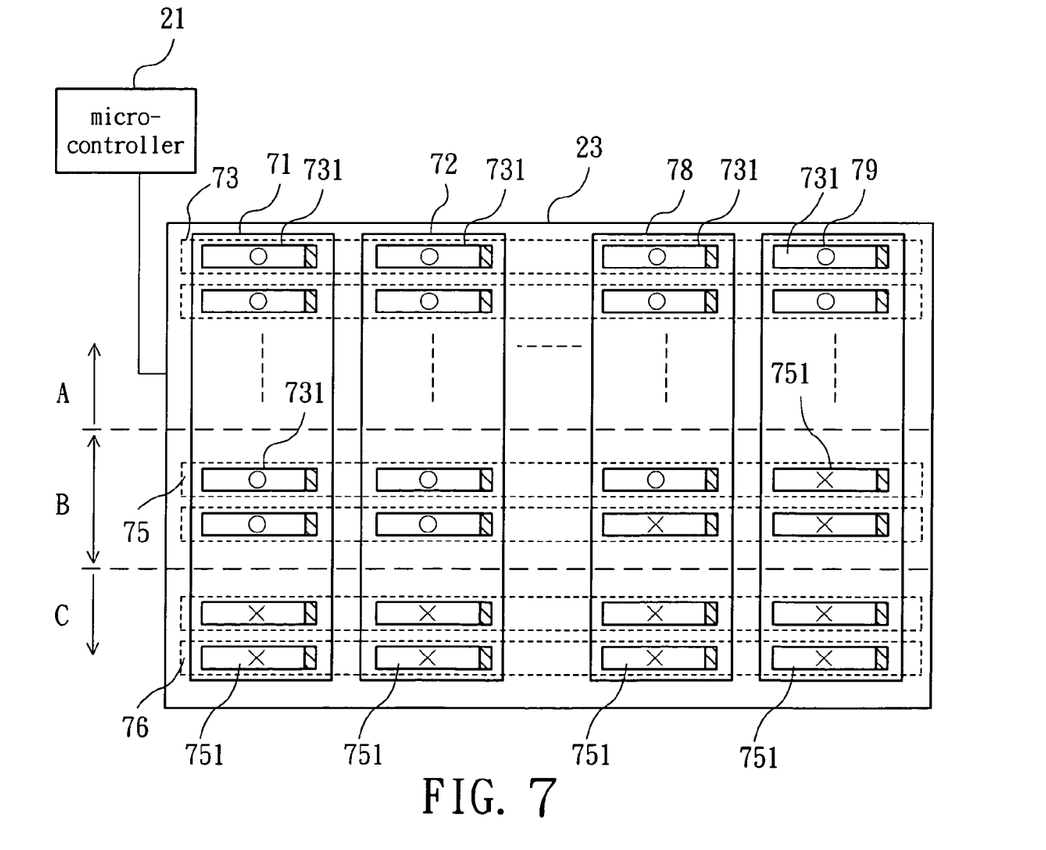
FIG. 7 is a structural diagram of a flash storage according to another embodiment of the present invention.

Finally, referring to FIG. 7, there is shown a structural diagram according to another embodiment of the present invention. As illustrated in this figure, the flash memory 23 of the present invention comprises a plurality of storages (multi-bank architecture) 71, 72, 78, and 79 therein, at least one physical memory block 731 in each of storages 71, 72, 78, 79 corresponding to one another constituting a memory page 73 together. If the same memory page 73 is provided therein with constructed elements—physical memory blocks which are all perfect physical memory blocks 731 without defects, this memory page may be defined as a normal memory page 73. Conversely, if the same memory page is presented therein with at least one physical memory block being the imperfect physical memory block 751 with defects, it may be defined as an abnormal memory page 75. In addition, if the same memory page is provided therein with physical memory blocks which are all imperfect physical memory blocks 751, it may be defined as an invalid memory page 76. By means of internal arrangement performed by the micro-controller 21, all of the normal memory pages 73 may be arranged in a front section A of the flash memory 23, all of the abnormal memory pages 75 may be arranged in a rear section B of the flash memory 23, while all of the invalid memory pages 76 may be arranged in a last section C of the flash memory 23. By way of such an arrangement, the object of speeding data access may be obtained.

To sum up, it should be understood that the present invention is related to a flash storage allowed for not only shortening the startup duration thereof, but also saving a memory capacity of a registered memory and securing data access.

Therefore, this application is filed in accordance with the patent law duly, since the present invention is truly an invention with novelty, advancement or non-obviousness, and availability by the industry, thus naturally satisfying the requirements of patentability. Your favorable consideration will be appreciated.

The foregoing description is merely one embodiment of present invention and not considered as restrictive. All equivalent variations and modifications in process, method, feature, and spirit in accordance with the appended claims may be made without in any way from the scope of the invention.

The invention claimed is:

1. A flash storage, comprising:
   a micro-controller;
   at least one flash memory, connected to said micro-controller, said flash memory comprising a plurality of physical memory blocks therein, each of said physical memory blocks further comprising a physical address and a plurality of physical sectors, and then each of the physical sectors at least comprising a user data column and a logical address pointer column, wherein writing logical address pointer data into each logical address pointer column is allowed when said user data column is stored therein with physical data, said logical address pointer data being recorded with a logical address of a logical memory block corresponding to said physical memory block; and
   a registered memory, connected to said micro-controller, used for storing a linkage table recorded with said physical address of each physical memory block and said logical address of said logical memory block corresponding thereto,
   wherein each of said logical address pointer columns in the same physical memory block is stored with the same logical address.

2. The flash storage according to claim 1, wherein said linkage table is created by scanning said logical address pointer data in each physical memory block when said micro-controller boots.

3. The flash storage according to claim 1, wherein said flash memory therein is divided into a host accessible area and a system control area, said physical memory block located in said host accessible area being defined as a data memory block, said physical memory block located in said system control area being defined as a control memory block, wherein at least one control memory block is used to load and store said linkage table, being a backup linkage table.

4. The flash storage according to claim 3, wherein said linkage table is created by loading said backup linkage table directly when said micro-controller boots.

5. The flash storage according to claim 3, wherein a plurality of said control memory blocks are provided for storing said backup linkage table, and loading said linkage table having been stored in said registered memory by turns.

6. The flash storage according to claim 1, wherein said micro-controller is connected with an application system.

7. The flash storage according to claim 6, wherein said application system is selected from one of a host system, a player system, and a recording system.

8. The flash storage according to claim 1, wherein said physical sector further comprises a control data, and an error check code, said error check code used for protecting said physical data, said logical address pointer data, and said control data.

9. The flash storage according to claim 1, wherein one of said physical memory blocks of said flash memory is defined as a memory type block used for storing a memory accessing program to be loaded directly when said micro-controller boots, so as to execute data accessing operation with respect to said flash memory.

10. The flash storage according to claim 1, wherein said flash storage comprises a system clock, said system clock further comprising a plurality of rising edges and a plurality of falling edges, each of rising edges and each of falling edges being respectively selected as a basis for the change of a data access signal with respect to said micro-controller.

11. A flash storage, comprising:
    a micro-controller;
    at least one flash memory, connected to said micro-controller, said flash memory comprising a plurality of physical memory blocks therein, each of said physical memory blocks further comprising a physical address and a plurality of physical sectors, and then each of the physical sectors at least comprising a user data column and a logical address pointer column, wherein writing logical address pointer data into each logical address pointer column is allowed when said user data column is stored therein with physical data, said logical address pointer data being recorded with a logical address of a logical memory block corresponding to said physical memory block; and
    a registered memory, connected to said micro-controller, used for storing a linkage table recorded with said physical address of each physical memory block and said logical address of said logical memory block corresponding thereto,
    wherein said flash memory therein is divided into a plurality of memory segments, comprising a plurality of physical memory blocks, and all of said logical address pointer data in the same memory segment are combined as one memory segment address mapping table allowed for replacing said linkage table and stored in said registered memory.

12. The flash storage according to claim 11, wherein said memory segment address mapping table further comprises that constituted by all of logical address pointer data in a plurality of said memory segments together.

13. The flash storage according to claim 11, wherein said flash memory therein is divided into a host accessible area and a system control area, said physical memory block located in said host accessible area being defined as a data memory block, said physical memory block located in said system control area being defined as a control memory block, wherein at least one control memory block is used to load and store said memory segment address mapping table, being a backup memory segment address mapping table.

14. The flash storage according to claim 11, wherein the preferred number of said physical memory blocks in each of said memory segments is 256.

15. The flash storage according to claim 11, wherein the capacity of said registered memory approximates to the size of said memory segment address mapping table.

16. A flash storage, comprising:
    a micro-controller;
    at least one flash memory, connected to said micro-controller, said flash memory comprising a plurality of physical memory blocks therein, each of said physical memory blocks further comprising a physical address and a plurality of physical sectors, and then each of the physical sectors at least comprising a user data column and a logical address pointer column, wherein writing logical address pointer data into each logical address pointer column is allowed when said user data column is stored therein with physical data, said logical address pointer data being recorded with a logical address of a logical memory block corresponding to said physical memory block;

a registered memory, connected to said micro-controller, used for storing a linkage table recorded with said physical address of each physical memory block and said logical address of said logical memory block corresponding thereto; and a plurality flash memories, wherein at least one physical memory block in any one of said flash memories and at least one physical memory block in the rest of said flash memories corresponding thereto may be combined as one memory segment, and all of logical address pointer data in the same memory segment are combined as one memory segment address mapping table allowed for replacing said linkage table and stored in said registered memory.

17. The flash storage according to claim 16, wherein said plurality of flash memories are connected with said micro-controller in the form of series, parallel, or parallel/series selectively.

18. A flash storage, comprising:
a micro-controller;
at least one flash memory, connected to said micro-controller, said flash memory comprising a plurality of physical memory blocks therein, each of said physical memory blocks further comprising a physical address and a plurality of physical sectors, and then each of the physical sectors at least comprising a user data column and a logical address pointer column, wherein writing logical address pointer data into each logical address pointer column is allowed when said user data column is stored therein with physical data, said logical address pointer data being recorded with a logical address of a logical memory block corresponding to said physical memory block; and a registered memory, connected to said micro-controller, used for storing a linkage table recorded with said physical address of each physical memory block and said logical address of said logical memory block corresponding thereto, wherein said flash memory comprises a plurality of storages, and at least one physical memory block in each storage corresponding to one another may be allowed to constitute one memory page together, wherein all of said physical memory blocks in the memory page are all perfect physical memory blocks without defects being defined as a normal memory page, while another memory page in which at least one physical memory block presented therein is an imperfect physical memory block with defects being defined as an abnormal memory page, said normal memory page being arranged in a front section of said flash memory and said abnormal memory page being arranged in a rear section of said flash memory by means of the operation of said micro-controller.

19. The flash storage according to claim 18, wherein if one of said memory pages is provided therein with said physical memory blocks, which are all said imperfect physical memory blocks, it is defined as an invalid memory page arranged in a last section of said flash memory.

20. A flash storage, mainly comprising:
a micro-controller;
at least one flash memory, connected to said micro-controller, each of flash memories therein being separated by a plurality of memory segments, each of memory segments comprising a plurality of physical memory blocks therein, each of physical memory blocks further comprising a physical address and logical address pointer data therein, said logical address pointer data being recorded with a logical address of a logical memory block corresponding to said physical memory block, and each of said logical address pointer data in the same memory segment being combined together as a memory segment address mapping table; and a registered memory, connected to said micro-controller, used for storing said memory segment address mapping table.

21. The flash storage according to claim 20, wherein the preferred number of said physical memory blocks in each of said memory segments is 256.

22. The flash storage according to claim 20, wherein the capacity of said registered memory approximates to the size of said memory segment address mapping table.

23. A flash storage, mainly comprising:
a micro-controller;
a plurality of flash memories, connected with said micro-controller in the form of series, parallel, or parallel/series selectively, each of flash memories comprising a plurality of physical memory blocks, at least one physical memory block in any one of said flash memories and at least one physical memory block in the rest of said flash memories corresponding thereto being combined together as a memory segment, each of physical memory blocks further comprising a physical address and logical address pointer data therein, said logical address pointer data being recorded with a logical address of a logical memory block corresponding to said physical memory block, and further, each of said logical address pointer data in the same memory segment being combined together as a memory segment address mapping table; and a registered memory, connected to said micro-controller, used for storing said memory segment address mapping table.

24. A flash storage, comprising a micro-controller connected to at least one flash memory, said flash memory comprising a plurality of storages, and at least one physical memory block in each of storages corresponding to one another being allowed to constitute one memory page together, wherein all of said physical memory blocks in the memory page are all perfect physical memory blocks without defects being defined as a normal memory page, while another memory page in which at least one physical memory block presented therein is an imperfect physical memory block with defects being defined as an abnormal memory page, said normal memory page being arranged in a front section of said flash memory and said abnormal memory page being arranged in a rear section of said flash memory by means of the operation of said micro-controller.

25. The flash storage according to claim 24, wherein if one of said memory pages is provided therein with said physical memory blocks, which are all said imperfect physical memory blocks, it is defined as an invalid memory page arranged in a last section of said flash memory.

* * * * *